United States Patent
Schulze et al.

(10) Patent No.: US 7,954,596 B2
(45) Date of Patent: Jun. 7, 2011

(54) ACOUSTICALLY AND THERMALLY ACTING INSULATION

(75) Inventors: Volkmar Schulze, Schierling (DE); Hans-Peter Keller, Suhr (CH); Volker Kursch, Essen (DE)

(73) Assignee: Entwicklungsgesellschaft fur Akustik (EfA) mit beschrankter Haftung, Witten (DE)

( * ) Notice: Subject to any disclaimer, the term of this patent is extended or adjusted under 35 U.S.C. 154(b) by 203 days.

(21) Appl. No.: 12/303,988

(22) PCT Filed: May 31, 2007

(86) PCT No.: PCT/EP2007/055356
§ 371 (c)(1),
(2), (4) Date: Jan. 5, 2009

(87) PCT Pub. No.: WO2007/141193
PCT Pub. Date: Dec. 13, 2007

(65) Prior Publication Data
US 2010/0224438 A1    Sep. 9, 2010

(30) Foreign Application Priority Data
Jun. 9, 2006 (DE) .......................... 10 2006 027 230

(51) Int. Cl.
*F02B 77/13* (2006.01)
*E04B 1/82* (2006.01)

(52) U.S. Cl. ........ 181/204; 181/284; 181/286; 181/290; 181/296

(58) Field of Classification Search .................. 181/204, 181/207
See application file for complete search history.

(56) References Cited

U.S. PATENT DOCUMENTS

| 4,716,986 | A | * | 1/1988 | Umemoto et al. | 181/207 |
| 6,145,617 | A | * | 11/2000 | Alts | 181/290 |
| 6,805,219 | B2 | * | 10/2004 | Yasuda et al. | 181/204 |
| 2003/0047379 | A1 | * | 3/2003 | Lecours | 181/204 |
| 2003/0012431 | A1 | | 7/2003 | Rajendran | |
| 2009/0038875 | A1 | * | 2/2009 | Michalke et al. | 180/292 |

FOREIGN PATENT DOCUMENTS

| DE | 10324257 B3 | 9/2004 |
| EP | 1029742 A | 8/2000 |
| WO | WO9818657 A | 5/1998 |
| WO | WO9944817 A | 9/1999 |
| WO | WO03021096 A | 3/2003 |

OTHER PUBLICATIONS

BASF P433 6./.10.03 "Thermische Motorkapselung mit PUR-Schaum—ein Weg zu weniger Kraftstoffverbrauch and mehr Verkehrssicherheit" in Polymers in the Automotive Industry, vol. 1, Nos. 11+12 / 03, p. 14.

* cited by examiner

*Primary Examiner* — Forrest M Phillips
(74) *Attorney, Agent, or Firm* — Harness, Dickey & Pierce, P.L.C.

(57) ABSTRACT

The invention relates to a multilayered acoustically and thermally effective insulation having a defined layer structure, especially for internal combustion engines of motor vehicles.

12 Claims, 2 Drawing Sheets

ACOUSTICALLY AND THERMALLY ACTING INSULATION

FIELD

Figure 1:
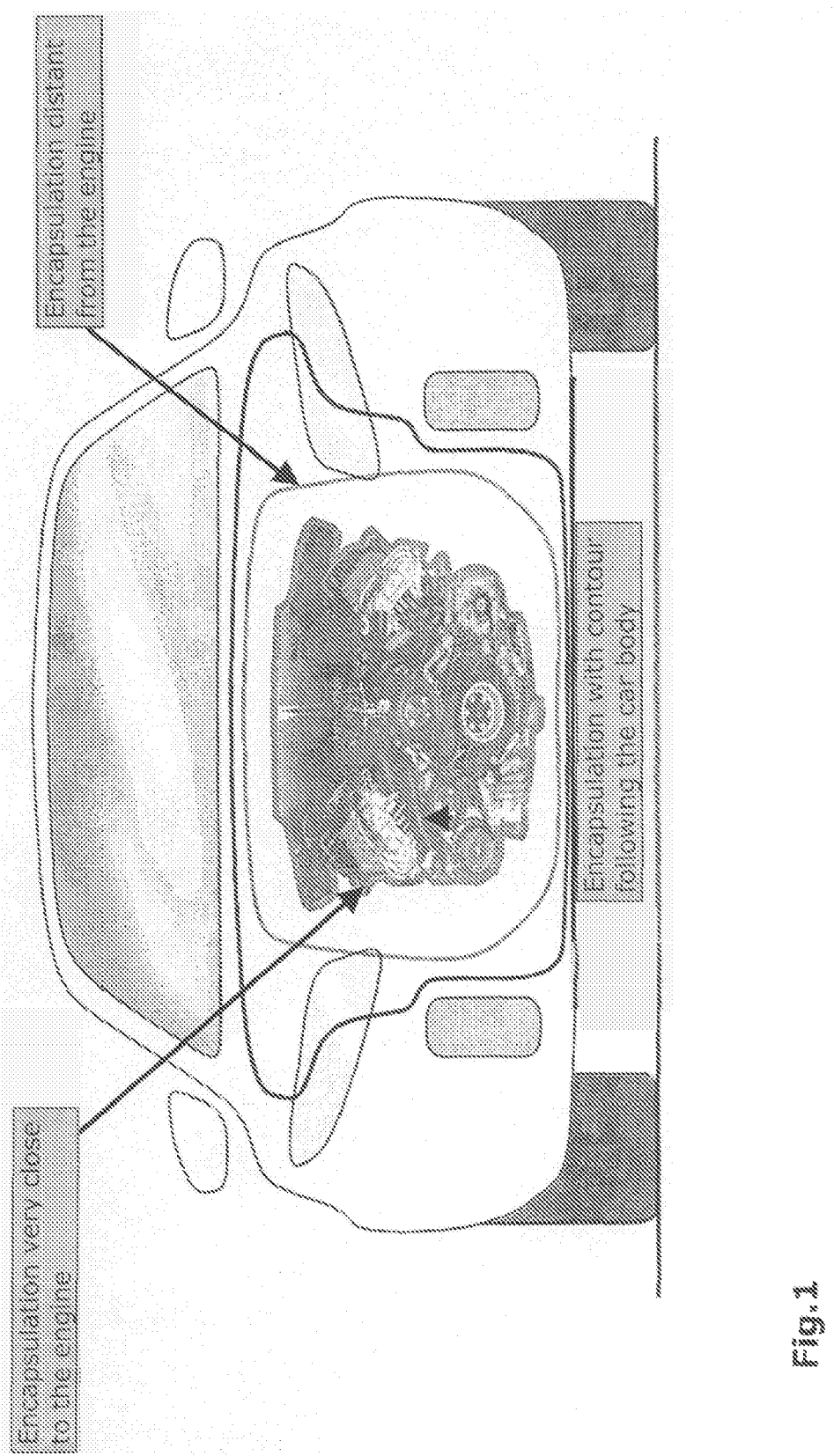

The present disclosure relates to a multilayered acoustically and thermally effective insulation having a defined layer structure for internal combustion engines of motor vehicles.

BACKGROUND

In the engine compartment of motor vehicles, a high number of individual sound insulations are mounted today. Essentially, these are referred to as the hood, dashboard and tunnel sound insulations as well as the undershield with absorber, the design cover with absorber and the acoustically effective heat shields. Recently, the textile wheel house panels have also been included in this group. In terms of material construction, the sound insulations are classified into mere absorbers, mass absorber systems, spring-mass systems and sandwich components in general. As absorber materials, temperature-resistant covering fleeces, PUR lightweight/cut foams, melamine resin foam, flock composite foam and single-fiber or mixed-fiber fleeces, in part in combination. As damping materials, highly filled PUR foams, integral foams, EVA/PE/PP/EPDM heavy sheets and TPE/TPO injection-molded parts are employed, which are in turn combined with the absorber materials. The design covers are mostly PA injection-molded parts, and the acoustically effective heat shields are usually sandwich components consisting of microperforated aluminum foil, rock wool, foam and single-fiber or mixed-fiber fleece.

DE 198 21 532 A describes a heat-insulating and soundproofing lining for the engine compartment of motor vehicles, especially for the dashboard or tunnel, consisting of covering fleeces on two sides with acoustically insulating foam or fleece layers sandwiched between. The bonding of the layers is achieved by adhesive layers. It is described that a metal foil is arranged on the engine side partially or on the whole area for heat protection.

DE 199 59 089 A describes that a convection channel for a gas fluid is additionally provided between the layers, and that the application thereof is intended, in particular, for hood insulation or dashboard lining.

WO 98/46456 A describes that the cavities are configured as lambda/4 resonators in an engine hood sound insulation, which is also employed for forming a heat shield.

Another resonator application in the hood in the form of a tube closed on one side is described in DE 197 55 750 A. A sound-absorbing cover with an absorber consisting of a plastic shell and foam materials provided between foam cover layers is described in DE 199 04 986 A. Shell decouplers for decoupling such design covers on vibrating parts, such as internal combustion engines, are described in DE 198 24 905 A. WO 2004/090307 describes an aggregate cover in the engine compartment of a motor vehicle consisting of a support part and a molded part of a sound-absorbing material integrally connected therewith.

DE 197 22 037 A describes a heat shield with a sound insulation in which a defined air gap is provided between the heat shielding plate and a support layer comprising the sound absorption layer facing the heat and sound source.

An acoustic cover that partially or completely covers the engine compartment on its upside and is integrated into these functional or control components of the internal combustion engine is described in DE 198 25 739 A.

A sound insulation plate mounted near the engine within the engine compartment for damping the engine noise is described in DE 198 47 441 A; a sound-absorbing material is provided on the top and bottom sides thereof.

DE 100 34 301 A describes a sound-insulated housing consisting of a light metal foam and plastic sandwich structure; the plastic material is preferably an elastomer material. A vibration-damping and sound-absorbing part consisting of a foam body and a stiff portion is described in DE 197 39 778 A. Said foam body is on the vibrating region of the vehicle part, and the stiff portion is outside. The utility model specification DE 20 2004 020 028 U describes a sound absorber for motor vehicle engines consisting of a self-supporting component and a sound-absorbing element and being positioned between the engine and radiator with the sound-absorbing element facing towards the engine.

The mentioned prior art does not relate to an acoustically and thermally effective insulation of an internal combustion engine. These sound insulations do not have a "closed" capsule effect; they are mounted as separate parts (mutually open to sound). On the other hand, sufficiently known material combinations are described in their relative position.

DE 198 18 859 A describes a noise capsule for the exhaust gas system that is designed and born in a way elastically compliant towards a force acting from below. This capsule does not have an absorptive and thermal effect either.

A foam with integrated thermoplastic substances is described in EP 1 184 149 A for soundproof covering. Urethane is mentioned as a foam, and polystyrene and styreneacrylate copolymer are mentioned as thermoplastic substances.

A (thermally stable) polyurethane foam is also used in DE 199 35 335 A for encapsulation. The foam is directly foamed and applied to the engine, or applied as a self-supporting molded part or as a self-supporting composite part. See also the press release BASF P433 6./.10.03 "Thermische Motorkapselung mit PUR-Schaum—ein Weg zu weniger Kraftstoffverbrauch und mehr Verkehrssicherheit" in Polymers in the Automotive Industry, Vol. 1, Nos. 11+12/03, p. 14.

EP 1 029 742 A also describes a polyurethane foam for insulation; in particular, surface-active agents are employed. The foam is partially localized in the engine compartment, not as a capsule.

However, these designs can no longer be employed near the engine due to the temperature conditions in current engine compartments under the aspect of heat management; also, there is no purposeful coupling of acoustic and thermal insulation.

The sound-protection capsule described in DE 199 10 516 A consists of a housing and an adsorption layer applied to the inside thereof. In its material construction, the housing consists of several layers having a high modulus of elasticity; the layers themselves are interconnected by damping layers. As the materials, aluminum sheets are mentioned for the housing, and double-sided adhesive sheets are mentioned for the damping layers. The absorber layer consists of open-pore foam, fleece or basalt rock wool.

The sound absorption device for an engine compartment cover according to DE 100 25 826 A consists of several sound absorption plates respectively provided with a center part having sound-reflecting properties and with sound absorption elements attached to both lateral surfaces of the center part. These plates are juxtaposed near the aeration slots of the cover.

EP 0 921 291 A describes a driving capsule of a vehicle in which individual capsule elements with acoustic insulation are selectively connected by special connection channels. These channels and other guiding aids effect the supply and circulation of cooling air.

DE 199 14 934 A describes a sound-damped machine housing in which the noise encapsulation includes separate chambers closed in themselves and formed by tub-like regions integrated into the outer wall and closed by caps. The caps are connected with the edges of the tub-like regions by bonding with a permanently elastic adhesive to decouple vibrations and to seal them all around. At least some of the caps are designed as multipart bodies with a sound-damping intermediate layer. An assembly for damping the sound emitted by an engine/pump aggregate with a sound-damping cover for the engine/pump aggregate is described in DE 199 60 224 A. The cover is designed as a sound-damping hood that is put over the engine/pump aggregate without touching it.

DE 100 06 618 A describes a noise capsule partially formed from hollow spaces flowed through by coolant medium. This capsule consists of a plastic material and encloses part of the internal combustion engine. A sound-insulating housing with a special circulation of cooling water and air is described in EP 0 935 058 A. A damping capsule with noise-absorbing elements is described in DE 195 43 495 A. The absorption material is arranged along the sound path with varying thickness. An internal combustion engine encapsulated to insulate sound is described in DE 10 2004 017 362 A. In this case, the hood is provided with a sound absorption element; a pedestrian-protecting deformation element is arranged between the hood and the sound absorption element.

This prior art does not relate to a capsule having a thermal effect or the purposeful coupling of acoustic and thermal insulation.

This also applies to the engine compartment of a motor vehicle as described in DE 10 2004 028 593 A in which heat-shielding components are described in their position relative to one another and to the parts to be protected.

DE 103 24 257 B3 relates to a sound absorber consisting of two interconnected textile fiber fleeces (1, 2) bonded with a thermoplastic and/or thermosetting adhesive wherein the textile fiber fleece (1) facing towards the sound emission source has a layer thickness within a range of from 2 to 15 mm, a density within a range of from 50 to 500 kg/m$^3$, a basis weight within a range of from 0.1 to 5 kg/m$^2$, and a flow resistance within a range of from 50 to 1000 kNs/m$^4$, and the textile fiber fleece (2) facing away from the sound emission source has a layer thickness within a range of from 10 to 100 mm, a density within a range of from 20 to 100 kg/m$^3$, a basis weight within a range of from 0.5 to 1 kg/m$^2$, and a flow resistance within a range of from 10 to 40 kNs/m$^4$, with a total thickness of the sound absorber within a range of from 12 to 30 mm and a total basis weight of the sound absorber within a range of from 0.5 to 3 kg/m$^2$.

In principle, all the components in the automobile industry must be judged by their contribution to the constantly increasing demands in terms of economic efficiency in fuel consumption and environmental compatibility. With respect to insulating or damping molded parts, the focus in this respect had been primarily to achieve weight reduction and/or recyclability of the molded parts or materials.

It is known that internal combustion engines are subject to an increased fuel consumption and wear in the cold running phase. Therefore, it is altogether usual in the prior art that the cooling of the engine cooling circulation or the withdrawal of engine heat for heating purposes in the passenger compartment is started only after a particular temperature of the engine has been achieved. In contrast, a thermally insulating engine encapsulation has not been considered because of the problems necessarily involved.

Namely, in addition to the expected high weight, engine encapsulations have basically the problem of having a high impact on the acoustic reactions within the engine compartment and thus on the noise level within the passenger compartment and outside the vehicle ("pass-by noise").

SUMMARY

Therefore, it is the object of the present invention to provide as lightweight an acoustically and thermally effective insulation as possible, especially for motor vehicle construction, which combines a balanced reduction of the engine noise in the passenger compartment and of the "pass-by noise" with a high economic efficiency in fuel consumption and environmental compatibility.

DRAWINGS

FIG. 1 illustrates the principle of the different capsule variants.

Figure 2:
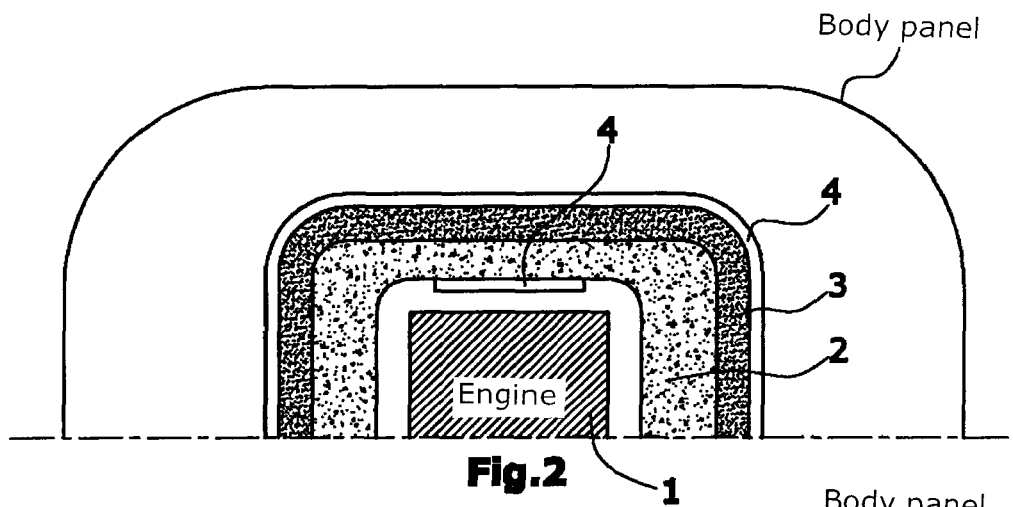
Figure 3:
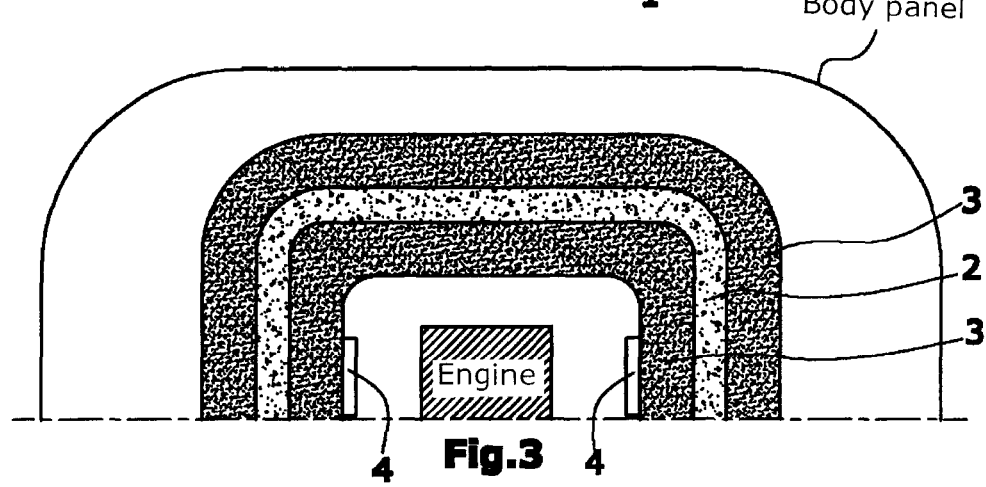
Figure 4:
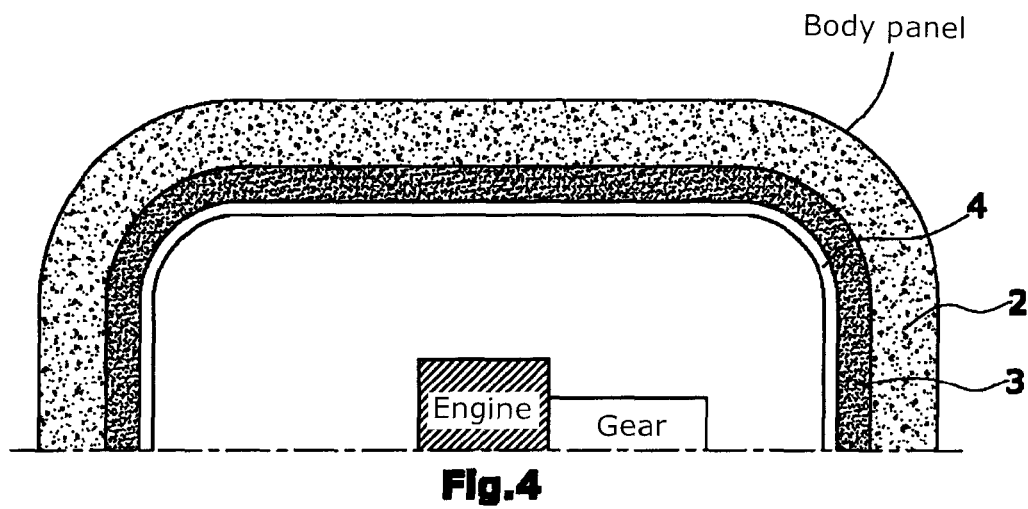

FIGS. 2 to 4 schematically illustrate the structure of the engine capsule in the different pure forms of capsule variants. It is to be considered that different parts of the variants may be combined in one encapsulation. FIG. 2 shows the encapsulation that is very close to the engine, FIG. 3 shows the one that is distant from the engine, and FIG. 4 shows the encapsulation adjacent to the body panel.

DETAILED DESCRIPTION

The above object of the invention is achieved, in principle, by three different approaches, namely:

a capsule very close to the engine (1);
a capsule distant from the engine (2); and
a capsule attached to the car body (3).

(1) In a first aspect of the invention, the object is achieved by a multilayered acoustically and thermally effective insulation of an internal combustion engine of a motor vehicle comprising at least three layers (1, 2, 3) having different flow resistance values and being connected with one another over the full area thereof, comprising:

an air gap (1) having a thickness of at least 1 mm and being very close to the engine block;

a layer (2) in contact therewith having a flow resistance (air) within a range of from 50 to 150 kNs/m$^4$, a layer thickness of from 5 to 50 mm and a basis weight of from 0.04 to 2.5 kg/m$^2$; and a layer (3) subsequent to layer (2) and facing towards the engine compartment, having a flow resistance (air) within a range of from 200 to 600 kNs/m$^4$, a layer thickness of from 0.5 to 8 mm and a basis weight of from 0.2 to 5 kg/m$^2$;

wherein the difference of the flow resistance values (air) of layers (3) minus (2) is at least 150 to 550 kNs/m$^4$, the difference of the layer thickness values of layers (2) minus (3) is at least 4.5 to 49.5 mm, and the difference of the basis weights of layers (3) minus (2) is at least 0.16 to 4.96 kg/m$^2$. For attaching the engine capsule that is very close to the engine, they have regions without an air gap, so that the layer (2) is directly supported on the engine in these regions or is connected therewith.

(2) In another aspect of the invention, the object is achieved by a multilayered acoustically and thermally effective insulation of an internal combustion engine of a motor vehicle comprising at least three layers (3, 2, 3) having different flow resistance values and being connected with one another over the full area thereof, comprising:

a layer (3) facing the engine block at some distance, having a flow resistance (air) within a range of from 200 to 600 kNs/m$^4$, a layer thickness of from 0.5 to 8 mm and a basis weight of from 0.2 to 5 kg/m$^2$; and a layer (2) subsequent to layer (3) on the side facing away from the engine block, having a flow resistance (air) within a range of from 50 to 150 kNs/m$^4$, a layer thickness of from 5 to 50 mm and a basis weight of from 0.04 to 2.5 kg/m$^2$;

a layer (3) subsequent to layer (2) and facing towards the body panel, having a flow resistance (air) within a range of from 200 to 600 kNs/m$^4$, a layer thickness of from 0.5 to 8 mm and a basis weight of from 0.2 to 5 kg/m$^2$;

wherein the difference of the flow resistance values (air) of layers (3) minus (2) is at least 50 to 550 kNs/m$^4$, the difference of the layer thickness values of layers (2) minus (3) is at least 4.5 to 49.5 mm, and the difference of the basis weights of layers (3) minus (2) is at least 0.16 to 4.96 kg/m$^2$. Thus, the engine capsule that is distant from the engine is self-supporting within the engine compartment.

(3) In a third aspect of the invention, the object is achieved by a multilayered acoustically and thermally effective insulation of an internal combustion engine of a motor vehicle comprising at least two layers (2, 3) having different flow resistance values and being connected with one another over the full area thereof, comprising:

a layer (2) adjacent to the body panel, having a flow resistance (air) within a range of from 50 to 150 kNs/m$^4$, a layer thickness of from 5 to 50 mm and a basis weight of from 0.04 to 2.5 kg/m$^2$; and a layer (3) subsequent to layer (2) and facing towards the engine compartment, having a flow resistance (air) within a range of from 200 to 600 kNs/m$^4$, a layer thickness of from 0.5 to 8 mm and a basis weight of from 0.2 to 5 kg/m$^2$;

wherein the difference of the flow resistance values (air) of layers (3) minus (2) is at least 50 to 550 kNs/m$^4$, the difference of the layer thickness values of layers (2) minus (3) is at least 4.5 to 49.5 mm, and the difference of the basis weights of layers (3) minus (2) is at least 0.16 to 4.96 kg/m$^2$. Thus, the engine capsule adjacent to the body panel and optionally to the hood has no air gap, in contrast to the engine capsule that is very close to the engine block.

Said position of the insulation that is very close to the engine block within the meaning of the invention at any rate includes an air gap between layer (2) and the engine block of at least 1 mm, especially 10 mm, more preferably within a range of from 5 mm to 8 mm. Such an air gap is particularly preferred according to the invention because it serves for the mechanical decoupling from the structure-born sound of the engine block. An insulation that is very close to the engine according to the invention is preferably attached by mechanical bonding and supported by the engine and forms a thermally and acoustically closed space.

A position of the insulation that is distant from the engine block within the meaning of the second embodiment of the invention means a position in the intermediate region between the body panel enclosing the engine compartment or the outer limits of the engine compartment and a position that is very close to the engine within the meaning of the invention. In particular, this means a position supported by the engine and/or car body and defined by a distance from the engine block to the boundary layer of the insulation facing towards the engine of at least 5 cm, preferably at least 10 cm, more preferably at least 20 cm, and by a distance from the body panel or the body panel enclosing the engine compartment to the boundary layer of the insulation facing away from the engine of at least 5 cm, preferably at least 10 cm, more preferably at least 20 cm.

In addition to the stated layers, the insulations according to the invention may include further layers, which means that one or more layers may follow layer (2) in the case of the first aspect, and layer (3) in the case of the second or third aspect. Preferably, they are respectively followed by a cover fleece layer, which may optionally be provided with a partially or entirely perforated metal foil.

Generally under the aspect of heat insulation, the following material constructions have proven useful:

cover fleece/glass wool/lightweight foam/glass wool/cover fleece;

cover fleece/phenol-resin-bonded cotton fiber mixed fleece/lightweight foam/cover fleece;

cover fleece/phenol-resin-bonded cotton fiber mixed fleece/lightweight foam/heavy sheet/cover fleece;

cover fleece/lightweight foam/heavy sheet/cover fleece.

Especially for application in the higher temperature range:

microperforated aluminum foil/lightweight foam/heavy sheet/cover fleece;

microperforated aluminum foil/glass wool/lightweight foam/glass wool/cover fleece;

microperforated aluminum foil/lightweight foam/phenol-resin-bonded cotton fiber mixed fleece/cover fleece;

microperforated aluminum foil/aluminum wool/cover fleece;

microperforated aluminum foil/aluminum wool/aluminum foil;

microperforated aluminum foil/aluminum wool/lightweight foam/cover fleece.

For the composite of materials to be open to flow and to have a highly absorptive encapsulation, microperforated foils are preferably employed towards the engine and towards the car body.

Preferably, microperforated aluminum foils having a thickness within a range of from 30 to 300 μm are employed; those additionally having a self-supporting or component-reinforcing function preferably have a thickness within a range of from 300 to 700 μm. The bonding with the other layers of the respective material construction is realized by an adhesive layer and/or by crimping.

The cover fleeces employed towards the car body are preferably designed as support fleeces, smooth or knobbed; they are often also provided with a sound deadening/damping means towards the next layer facing towards the engine.

In a knobbed embodiment, decoupling between the body panel and capsule is achieved in the body-supported capsule, which among others acts against corrosion due to the circulation of air enabled thereby.

Needled bilaminates or trilaminates are also employed as a support fleece, especially for ensuring the component stiffness; two- or three-layered sandwich non-woven fabrics, preferably PET/PP non-woven fabric or PET/natural fiber fleece layer (PP/kenaf/hemp/flax)-PP/PET.

The acoustically and thermally effective insulations according to the invention show surprisingly balanced and good acoustic absorption and damping properties even if the engine block is substantially or completely coated. The sound pressure level in the passenger compartment as well as outside the vehicle ("pass-by noise") is clearly reduced. In addition, the engine capsules according to the invention improve the warm-up behavior of the engine critically because of the substantially longer cooling time, which results in a substantially higher temperature level when the engine is restarted. Thus, the engine will reach its operation temperature in a very short period of time.

Another critical advantage of the engine capsules according to the invention is the fact that the excellent acoustic and thermal insulation properties can be realized at a low component weight. Thus, in the combination, an optimum fuel efficiency is achieved and the emission of pollutants reduced while the acoustic properties are excellent. An improved fuel efficiency manifests itself among others by a reduced consumption and lower carbon dioxide or carbon monoxide emission. When the engine capsules according to the invention are employed, the reduction of fuel consumption can be within a range of from 9 to 16% or more, especially up to 15%. In the driving cycle, the engine temperature remains at the usual operation temperature that is controlled by the cooling system when the engine capsules according to the invention are employed. That is to say, there is no risk of engine overheating even if the engine capsules according to the invention are employed.

From an acoustic point of view, the above described material constructions (open to flow, impedance step (layers 1/2)) ensure a sufficiently high insulation of air-born sound while absorption is optimized.

The layer materials are selected in such a way that the flow resistance of layer (3) is within a range of from 200 to 600 $kNs/m^4$, and the flow resistance of layer (2) is within a range of from 50 to 150 $kNs/m^4$. Thus, a clear impedance step is achieved.

It is of particular advantage if the insulations have some open-to-flow property.

It has been found particularly advantageous to select the layer thickness of layer (3) within a range of from 1.5 to 4.5 mm, and the layer thickness of layer (2) within a range of from 10 to 30 mm.

More preferably, the basis weight of layer (1 and/or 3) is within a range of from 0.5 to 3 $kg/m^2$, and the basis weight of layer (2) is within a range of from 0.1 to 1.5 $kg/m^2$, wherein the difference of basis weights of layers (3) minus (2) is at least 0.4 to 2.9 $kg/m^2$, in particular.

Especially for economic and acoustic reasons, it is particularly preferred if layer (3) consists of fiber materials with a thermoplastic or thermosetting binder and of open-cell rigid foam, while the overall structure is as lightweight as possible while simultaneously showing at least a thermal insulation and a high absorption of air-born sound and a sufficiently high damping of air-born sound.

Also, layer (2) more preferably consists of lightweight materials, such as high expansion foam (good acoustic absorption and thermal insulation);

cotton fiber fleeces (optionally reinforced with (glass/rock) fibers).

In order to increase the heat-insulating properties, the degrees of compression in the layer structure are to be kept as low as possible. The required component stiffness values are obtained by full-area or preferably partial area support layers/fleeces. The latter may in turn have perforations to obtain an open to flow design.

In another preferred embodiment, the surface exposed in the mounting state of all three embodiments is partially or completely provided with an optionally perforated, especially microperforated, metal foil (4), especially of aluminum. A further improvement of heat reflection is achieved thereby.

The microperforation can be effected with a different number/density of perforations per $cm^2$ over the whole surface, in accordance with the frequency emitted by the sound source. This is referred to as a frequency-optimized microperforation. Also, the geometry, distance and diameter of the perforations can be adjusted to the frequency emitted by the sound source.

In needled microperforations, the needle tract is always pointing inwards in the composite material (towards the absorptive layer). The thus obtained funnel structure gives the additional effect of a Helmholtz resonator.

It is particularly preferred to design layer (3) as a self-supporting layer.

The engine capsule according to the invention can have different designs. For example, it may be open, or it may be half open and merely partially encapsulate the engine block. In contrast, a full acoustic and thermal effectiveness is achieved if the internal combustion engine and the gear of the motor vehicle are completely encapsulated, i.e., the engine capsule is closed all around.

While the engine was running, the encapsulation according to the invention resulted in an improvement of the pass-by noise and of the interior noise within the passenger compartment in no load operation, for idle speed and under load and at high revolutions per minute.

For example, the acoustically and thermally effective insulation may also be designed as an integral component of an acoustically and thermally effective underbody of a motor vehicle and thus contribute to improved sound damping properties, wherein the aerodynamic effects of the underbody may also be improved.

Thus, for example, (textile) wheel-housing shells or heat shields may be integrated into such an underbody.

What is claimed is:

1. A multilayered acoustically and thermally effective insulation of an internal combustion engine of a motor vehicle comprising at least two layers having different flow resistance values and being connected with one another over the full area thereof, comprising:

a first layer in contact therewith having an air flow resistance within a range of from 50 to 150 $kNs/m^4$, a layer thickness of from 5 to 50 mm and a basis weight of from 0.04 to 2.5 $kg/m^2$;

a second layer subsequent to the first layer and facing away from the engine having an air flow resistance within a range of from 200 to 600 $kNs/m^4$, a layer thickness of from 0.5 to 8 mm and a basis weight of from 0.2 to 5 $kg/m^2$;

an air gap of at least 1 mm between the engine and the first layer, and wherein the difference of the air flow resistance values of the second layer minus the first layer is at least 150 to 550 $kNs/m^4$, the difference of the layer thickness values of the first layer minus the second layer is at least 4.5 to 49.5 mm, and the difference of the basis weights of the second layer minus the first layer is at least 0.16 to 4.96 $kg/m^2$.

2. A multilayered acoustically and thermally effective insulation of an internal combustion engine of a motor vehicle spaced away from said combustion engine comprising at least three layers connected with one another over the full area thereof, comprising:

a first layer having an air flow resistance within a range of from 50 to 150 $kNs/m^4$, a layer thickness of from 5 to 50 mm and a basis weight of from 0.04 to 2.5 $kg/m^2$;

a second layer facing the engine block, having a flow resistance within a range of from 200 to 600 $kNs/m^4$, a layer thickness of from 0.5 to 8 mm and a basis weight of from 0.2 to 5 $kg/m^2$; and another second layer occurring along the opposite side of said first layer and facing towards the body panel, having an air flow resistance within a range of from 200 to 600 kNs/m$^4$, a layer thickness of from 0.5 to 8 mm and a basis weight of from 0.2 to 5 kg/m$^2$;

wherein the difference of the air flow resistance values of the second layers minus the first layer is at least 50 to 550 kNs/m$^4$, the difference of the layer thickness values of the first layer minus the second layers is at least 4.5 to 49.5 mm, and the difference of the basis weights of the second layers minus the first layer is at least 0.16 to 4.96 kg/m$^2$.

3. A multilayered acoustically and thermally effective insulation of an internal combustion engine of a motor vehicle comprising at least two layers having different flow resistance values and being connected with one another over the full area thereof, comprising:

a first layer adjacent to a body panel, having an air flow resistance within a range of from 50 to 150 kNs/m$^4$, a layer thickness of from 5 to 50 mm and a basis weight of from 0.04 to 2.5 kg/m$^2$; and a second layer subsequent to the first layer and facing towards the engine, having an air flow resistance within a range of from 200 to 600 kNs/m$^4$, a layer thickness of from 0.5 to 8 mm and a basis weight of from 0.2 to 5 kg/m$^2$;

wherein the difference of the air flow resistance values of the second layer minus the first layer is at least 50 to 550 kNs/m$^4$, the difference of the layer thickness values of the first layer minus the second layer is at least 4.5 to 49.5 mm, and the difference of the basis weights of the second layer minus the first layer is at least 0.16 to 4.96 kg/m$^2$.

4. The insulation according to any of claims 1, 2 or 3, characterized in that the layer thickness of a second layer is within a range of from 1.5 to 4.5 mm, and the layer thickness of a first layer is within a range of from 10 to 30 mm.

5. The insulation according to any of claims 1, 2 or 3, characterized in that the basis weight of a second layer is within a range of from 0.5 to 3 kg/m$^2$, and the basis weight of a first layer is within a range of from 0.1 to 1.5 kg/m$^2$, wherein the difference of basis weight of the second layers minus the first layer is at least 0.4 to 2.9 kg/m$^2$.

6. The insulation according to any of claims 1, 2 or 3, wherein said insulation is self-supporting.

7. The insulation according to any of claims 1, 2 or 3, wherein said insulation is attached to the body of a car.

8. The insulation according to any of claims 1, 2 or 3, wherein said internal combustion engine of said motor vehicle is completely encapsulated.

9. The insulation according to any of claims 1, 2 or 3, comprising a metal foil.

10. The insulation according to claim 9, wherein said metal foil is perforated.

11. The insulation according to claim 9, wherein said metal foil is microperforated.

12. The insulation according to claim 9, wherein said metal foil is aluminum.

* * * * *